United States Patent
Ishita

(10) Patent No.: US 10,236,816 B2
(45) Date of Patent: Mar. 19, 2019

(54) MOTOR INVERTER

(71) Applicant: KABUSHIKI KAISHA TOYOTA JIDOSHOKKI, Kariya-shi, Aichi-ken (JP)

(72) Inventor: Yuko Ishita, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 15/911,257

(22) Filed: Mar. 5, 2018

(65) Prior Publication Data
US 2018/0254731 A1  Sep. 6, 2018

(30) Foreign Application Priority Data
Mar. 6, 2017 (JP) .................. 2017-041907

(51) Int. Cl.
*H02P 27/06* (2006.01)
*H02M 7/5375* (2006.01)
*H02P 29/024* (2016.01)
*H02M 7/5387* (2007.01)

(52) U.S. Cl.
CPC .......... *H02P 27/06* (2013.01); *H02M 7/5375* (2013.01); *H02P 29/024* (2013.01); *H02M 7/5387* (2013.01)

(58) Field of Classification Search
CPC .... H02P 27/06; H02P 29/024; H02M 7/5375; H02M 7/5387

USPC ........................................................ 318/139
See application file for complete search history.

(56) References Cited

U.S. PATENT DOCUMENTS

| | | | | |
|---|---|---|---|---|
| 2012/0249027 | A1* | 10/2012 | Wichert | H02P 29/032 318/400.3 |
| 2015/0365019 | A1* | 12/2015 | Yamamoto | H02P 1/022 318/490 |
| 2017/0030316 | A1* | 2/2017 | Sekiguchi | F02N 11/0866 |

FOREIGN PATENT DOCUMENTS

| | | | |
|---|---|---|---|
| JP | 2014-087204 A | | 5/2014 |
| JP | 2015033233 A | * | 2/2015 |

* cited by examiner

*Primary Examiner* — Kawing Chan
(74) *Attorney, Agent, or Firm* — Sughrue Mion, PLLC

(57) ABSTRACT

A motor inverter includes an inverter circuit having a plurality of switching elements, a capacitor, a precharge closing an opening and closing part, a controller closing the opening and closing part in response to the "ON" operation of the operational switch, wherein when charge is accumulated in the capacitor until voltage of the capacitor reaches a predetermined voltage value capable of determining whether or not short circuiting occurs, the controller controls a switching operation of the switching elements, and a determiner determining whether or not short circuiting occurs based on at least one of current flowing in the inverter circuit and voltage of the capacitor when the controller controls the switching operation of the switching elements in a state that the electric charge is accumulated in the capacitor and the opening and closing part is opened.

2 Claims, 4 Drawing Sheets

MOTOR INVERTER

BACKGROUND OF THE INVENTION

The present invention relates to a motor inverter.

Japanese Unexamined Patent Publication No. 2014-87204 discloses a motor inverter including an inverter circuit having switching elements, a capacitor, and a precharge circuit. In a precharge operation of the switching elements of the inverter circuit, the motor inverter determines whether or not short circuiting occurs based on current flowing in the inverter circuit or voltage of the capacitor.

Japanese Unexamined Patent Publication No. 2014-87204 discloses a step of maintaining check voltage as shown in FIG. 5 of its publication, and this step requires calculation. When a motor inverter including a precharge circuit detects short circuiting by the method disclosed in this publication, the motor inverter needs a sufficient start-up time until the precharge operation is completed. When a quick start operation is required, the period for the precharge operation is restricted by the period for the quick start operation.

The present invention is directed to providing a motor inverter which easily determines whether or not short circuiting occurs.

SUMMARY OF THE INVENTION

In accordance with an aspect of the present invention, there is provided In accordance with an aspect of the present invention, there is provided a motor inverter including an inverter circuit having a plurality of switching elements connected in a bridge configuration, wherein the inverter circuit has an electric power input connected to a DC power supply and an output connected to multiphase windings of an electric motor, and wherein each phase winding of the electric motor is supplied with electric power by a switching operation of the switching elements to drive the electric motor; a capacitor connected to the electric power input of the inverter circuit in parallel with each other, a precharge circuit having an opening and closing part provided in a line through which electric charge is accumulated in the capacitor and connected to the DC power supply via an operational switch, wherein the precharge circuit precharges the capacitor in response an "ON" operation of the operational switch before a main relay connected between the electric power input of the inverter circuit and the DC power supply is closed, a controller closing the opening and closing part in response to the "ON" operation of the operational switch, wherein when charge is accumulated in the capacitor until voltage of the capacitor reaches a predetermined voltage value capable of determining whether or not short circuiting occurs, the controller controls the switching operation of the switching elements in a state that the opening and closing part is opened, and a determiner determining whether or not short circuiting occurs based on at least one of current flowing in the inverter circuit and voltage of the capacitor when the controller controls the switching operation of the switching elements in a state that the electric charge is accumulated in the capacitor and the opening and closing part is opened.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the embodiments together with the accompanying drawings in which.

DETAILED DESCRIPTION OF THE EMBODIMENTS

Figure 1:
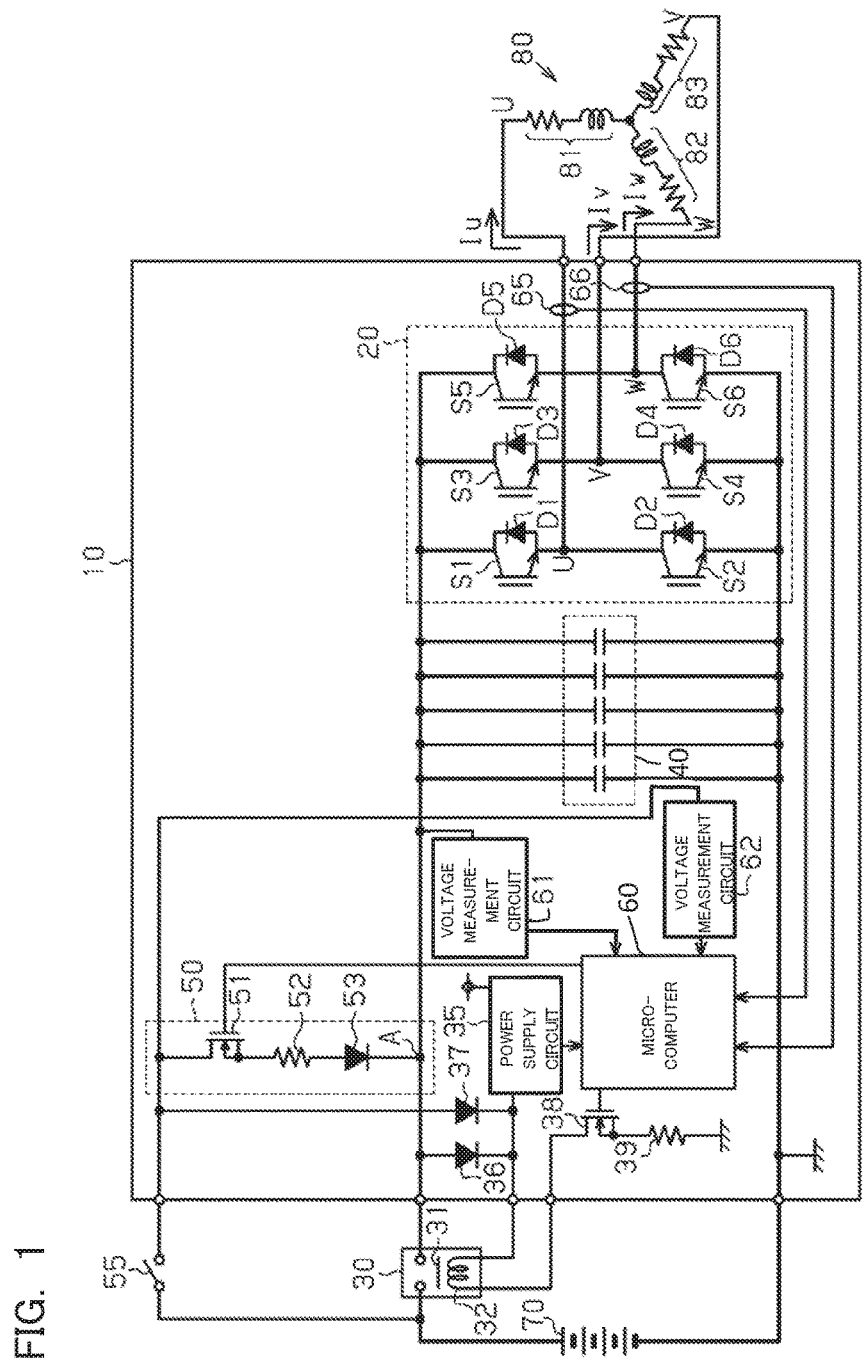
FIG. 1 is a circuit diagram illustrating a motor inverter according to an embodiment of the present invention.

The following will describe a motor inverter according to an embodiment of the present invention with the accompanying drawings. Referring to FIG. 1, a motor inverter 10 is of a three-phase type and includes an inverter circuit 20 and a microcomputer 60. The inverter circuit 20 has the electric power input connected to a battery 70 as a DC power supply and has the output connected to an electric motor 80. The electric motor 80 is a three-phase AC motor. The electric motor 80 includes windings 81, 82, and 83 as multiphase windings, which are connected to the output of the inverter circuit 20.

The inverter circuit 20 includes six switching elements S1, S2, S3, S4, S5, and S6 that drive the electric motor 80. The switching elements S1 to S6 each include an insulated gate bipolar transistor (IGBT) or a metal oxide semiconductor field effect transistor (MOSFET). Feedback diodes D1, D2, D3, D4, D5, and D6 are connected to the switching elements S1, S2, S3, S4, S5, and S6, respectively, in reverse parallel to each other.

In the inverter circuit 20, the first and second switching elements S1 and S2 are connected in series, the third and fourth switching elements S3 and S4 are connected in series, and the fifth and sixth switching elements S5 and S6 are connected in series. The first, third, and fifth switching elements S1, S3, and S5 are connected to the positive terminal side of the battery 70. The second, fourth, and sixth switching elements S2, S4, and S6 are connected to the negative terminal side of the battery 70.

The junction of the switching elements S1 and S2 defining the respective upper and lower arm elements is connected to the U-phase terminal of the electric motor 80. The junction of the switching elements S3 and S4 defining the respective upper and lower arm elements is connected to the V-phase terminal of the electric motor 80. The junction of the switching elements S5 and S6 defining the respective upper and lower arm elements is connected to the W-phase terminal of the electric motor 80. The inverter circuit 20 includes the switching elements S1 to S6 that are connected in a bridge configuration.

A U-phase current sensor 65 and a W-phase current sensor 66 are disposed between the inverter circuit 20 and the electric motor 80. The U-phase current sensor 65 and the W-phase current sensor 66 detect U-phase and W-phase currents Iu and Iw, respectively, of the three-phase currents Iu, Iv, and Iw that flow in the electric motor 80.

A main capacitor 40 is connected in parallel with the battery 70 to the electric power input of the inverter circuit 20. The main capacitor 40 is composed of a plurality of capacities connected in parallel with each other. The first, third, and fifth switching elements S1, S3, and S5 are connected to the positive terminal of the main capacitor 40. The second, fourth, and sixth switching elements S2, S4, and S6 are connected to the negative terminal of the main capacitor 40.

Thus, the battery 70 and the main capacitor 40 that are connected in parallel with each other are connected to the electric power input of the inverter circuit 20. That is, the main capacitor 40 is connected in parallel with the electric power input of the inverter circuit 20 of the motor inverter 10 and smooths the source voltage supplied from the battery 70.

The microcomputer 60, which serves as the controller of the motor inverter 10, has a memory that stores control programs to drive the electric motor 80 and data including mapped data, which is needed for executing the control programs.

The gates of the switching elements S1 to S6 are connected via a drive circuit (not shown) to the microcomputer 60. The microcomputer 60 controls the switching elements S1 to S6 to convert DC from the battery 70 to AC and supplies the electric power to the three-phase windings of the electric motor 80. Thus, each phase winding of the electric motor 80 is supplied with electric power by a switching operation of the switching elements S1 to S6, so that the electric motor 80 is driven. The U-phase current sensor 65 and the W-phase current sensor 66 are connected to the microcomputer 60. The microcomputer 60 outputs control signals to the switching elements S1 to S6 via the drive circuit based on detected signals from the U-phase current sensor 65 and the W-phase current sensor 66 so that the electric motor 80 generates a target output. The inverter circuit 20 converts DC supplied from the battery 70 and the main capacitor 40 to three-phase AC having an appropriate frequency and supplies the electric power to each phase winding of the electric motor 80. That is, each phase winding of the electric motor 80 is supplied with electrical power by the switching operation of the switching elements S1 to S6, so that the electric motor 80 is driven.

A main relay 30 is provided in the power line of the motor inverter 10 between the positive terminal of the battery 70 and the side of the main capacitor 40 and the inverter circuit 20. That is, the main relay 30 is provided between the battery 70 and the electric power input of the inverter circuit 20. The main relay 30 includes a relay contact 31 and a relay coil 32. The relay contact 31 is disposed in the power line between the positive terminal of the battery 70 and the side of the main capacitor 40 and the inverter circuit 20 of the motor inverter 10. When the relay coil 32 is supplied with electric power, the relay contact 31 is closed. One end of the relay coil 32 is connected to a power supply circuit 35 and the other end of the relay coil 32 is connected to the ground via a drive element 38 (transistor) for driving the main relay 30 (hereinafter referred to merely as the drive element 38) and a resistor 39. The gate of the drive element 38 is connected to the microcomputer 60. The microcomputer 60 turns on the drive element 38 so that the relay coil 32 is energized. The relay contact 31 of the main relay 30 is thereby closed.

The motor inverter 10 includes a precharge circuit 50. The precharge circuit 50 includes a drive element 51 (transistor) for a precharge operation (hereinafter referred to merely as the drive element 51), a precharge resistor 52, and a diode 53. The drive element 51, the precharge resistor 52, and the diode 53 are connected in series. One end of the drive element 51 is connected to the positive terminal of the battery 70 via a key switch 55. The other end of the drive element 51 is connected to the anode of the diode 53 via the precharge resistor 52. The cathode of the diode 53 is connected to the junction A between the main relay 30 and the main capacitor 40. When the key switch 55 is closed and the drive element 51 is turned on, the main capacitor 40 is precharged by the battery 70 via the key switch 55, the drive element 51, the precharge resistor 52, and the diode 53. The precharge circuit 50 is connected to the battery 70 via the key switch 55 as an operational switch and precharges the main capacitor 40 before the main relay 30 is closed in response to the "ON" operation of the key switch 55.

The power supply circuit 35 is supplied with electric power from the battery 70 by the diode 36 via the main relay 30 and by the diode 37 via the key switch 55.

A voltage measurement circuit 61 measures the voltage between the main relay 30 and the main capacitor 40. The measured result is sent to the microcomputer 60 that determines the voltage across the both ends of the main capacitor 40 (capacitor voltage). A voltage measurement circuit 62 measures the voltage between the key switch 55 and the drive element 51. The measured result is sent to the microcomputer 60 that determines the ON/OFF state of the key switch 55.

In the present embodiment, the motor inverter 10 includes the drive element 51 of the precharge circuit 50, which serves as an opening and closing part provided in the line through which electric charge is accumulated in the main capacitor 40.

The operation of the motor inverter 10 (controller) will now be explained. First, the control operation of the electric motor will be explained in the normal state without phase-to-phase short circuiting. The microcomputer 60 turns on the switching elements S1, S4, and S6 simultaneously, so that U-phase current Iu flows and turns on the switching elements S2, S3, and S6 simultaneously, so that V-phase current Iv flows and turns on the switching elements S2, S4, and S5 simultaneously, so that W-phase current Iw flows. Thus, in the operation of the motor inverter 10, electric power supplied from the battery 70 (main capacitor 40) is converted from DC to AC by switching operation of the switching elements S1 to S6 that are connected in a three-phase bridge configuration, so that the electric motor 80 is supplied with AC electric power. In this case, the microcomputer 60 controls the switching elements such that current flowing in each phase winding of the electric motor 80 has a desired value. After the operation is completed, the microcomputer 60 controls the switching elements such that electric charge accumulated in the main capacitor 40 is discharged in the windings of the electric motor 80.

Second, the steps for determining whether or not phase-to-phase short circuiting occurs when the key switch 55 is turned on will be explained. The microcomputer 60 executes the steps shown in FIG. 2.

Figure 2:
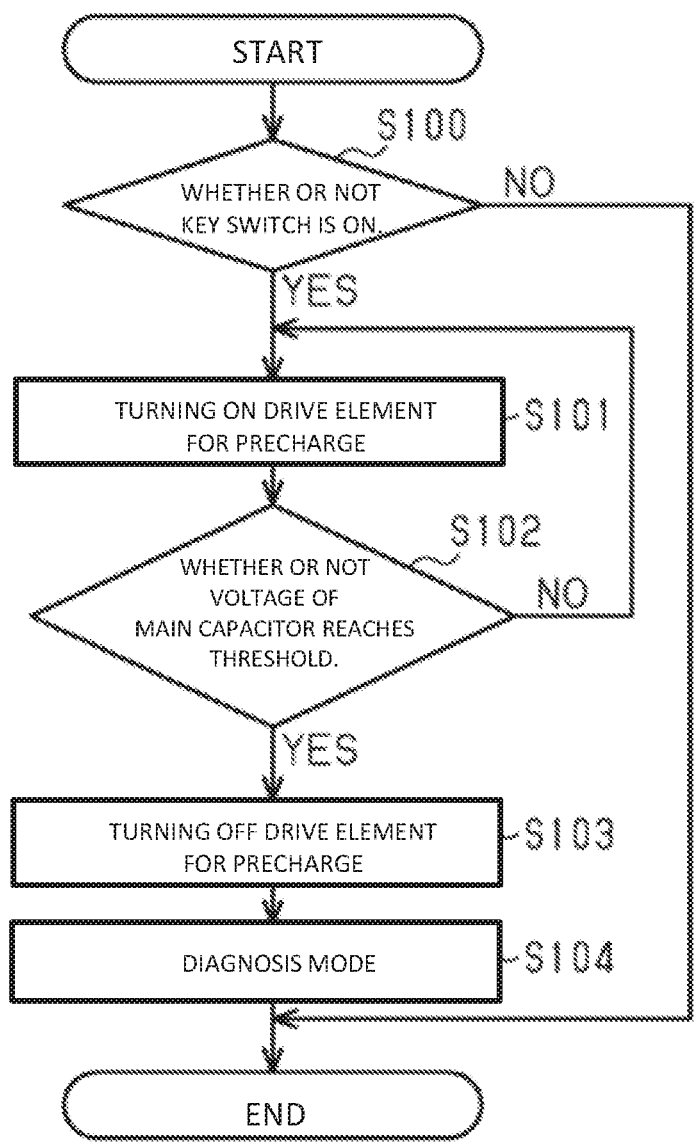
FIG. 2 is a flow chart illustrating the operation of the motor inverter of FIG. 1.

As shown in FIG. 2, the microcomputer 60 determines whether or not the key switch 55 is turned on in Step S100.

Figure 4:
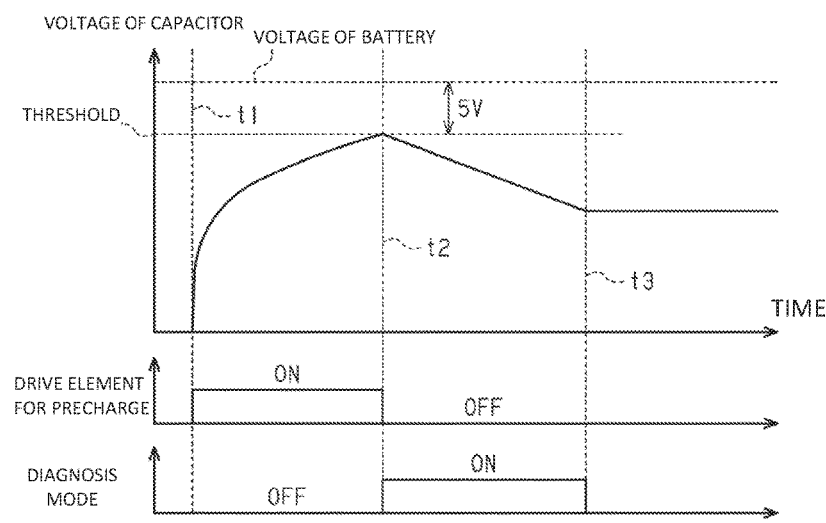
FIG. 4 is a timing chart illustrating the voltage of a capacity, the state of a drive element for precharge operation, and the diagnosis mode in the motor inverter of FIG. 1.

If YES in Step S100, Step S100 proceeds to Step S101. Referring to FIG. 4, the timing chart shows the voltage across the both ends of the main capacitor 40 when the key switch 55 is turned on at a timing t1. As shown in FIG. 2, the microcomputer 60 turns on the drive element 51 in Step S101. Accordingly, as shown in FIG. 4, the voltage of the main capacitor 40 increases after the timing t1. Subsequently, as shown in FIG. 2, Step S101 proceeds to Step S102. The microcomputer 60 determines whether or not the voltage of the main capacitor 40 reaches a threshold in Step S102. If NO in Step S102, Step S102 returns to Step S101.

As shown in FIG. 4, the voltage of the main capacitor 40 reaches the threshold at the timing t2. As shown in FIG. 2, if YES in Step S102, Step S102 proceeds to Step S103. The microcomputer 60 turns off the drive element 51 in Step S103.

That is, in response to the "ON" operation of the key switch 55 as an operational switch, the microcomputer 60 turns on (closes) the drive element 51. As a result, the voltage of the main capacitor 40 increases and the main capacitor 40 is charged. When the voltage of the main capacitor 40 reaches a predetermined threshold in which the microcomputer 60 can determine whether or not short circuiting occurs, the microcomputer 60 turns off (opens) the drive element 51.

Subsequently, Step S103 proceeds to Step S104. The microcomputer 60 sets a diagnosis mode and determines whether or not phase-to-phase short circuiting occurs. As shown in FIG. 4, the diagnosis mode is kept to "ON" during the timings t2 and t3. While the diagnosis mode is being kept to "ON", the drive element 51 is turned off.

As described above, microcomputer 60 as a controller determines whether or not phase-to-phase short circuiting occurs from at least one of the current flowing in the inverter circuit 20 and the voltage of the main capacitor 40 when the microcomputer 60 operates the switching elements S1 to S6 of the inverter circuit 20 under the states of charged main capacitor 40 and the turned-off (open) drive element 51. The current flowing in the inverter circuit 20 is measured by the current sensors 65 and 66. The voltage of the main capacitor 40 is measured by the voltage measurement circuit 61. The microcomputer 60 may determine whether or not phase-to-phase short circuiting occurs based on the voltage drop amount of the main capacitor 40.

Figure 3:
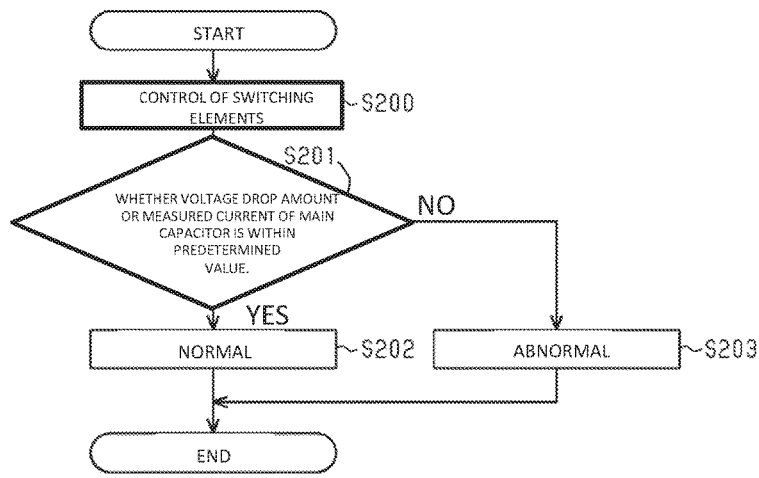
FIG. 3 is a flow chart illustrating the operation of the motor inverter of FIG. 1.

In the diagnosis mode, the microcomputer 60 executes steps shown in FIG. 3. As shown in FIG. 3, the microcomputer 60 controls the switching elements S1 to S6 in Step S200 and determines whether or not the voltage drop amount of the main capacitor 40 is within a predetermined value in Step S201. Otherwise, in Step S201, the microcomputer 60 determines current flowing in the inverter circuit 20 and determines whether or not the determined current is within a predetermined value.

If, in Step S201, the microcomputer 60 determines that the voltage drop amount of the main capacitor 40 is within a predetermined value or that the measured current is within a predetermined value, the microcomputer 60 determines that the voltage or the current is normal in Step S202. If YES at Step S202, the microcomputer 60 turns on the drive element 38 to supply the relay coil 32 with electric power and to turn on the main relay 30. In this case, the main relay 30 can be closed without an increase in rush current because the main capacitor 40 is charged.

If, in Step S201, the microcomputer 60 determines that the voltage drop amount of the main capacitor 40 is not within a predetermined value or that the determined current is not within a predetermined value, the microcomputer 60 determines that the voltage or the current is abnormal in Step S203.

Example determination of phase-to-phase short circuiting will now be explained. Phase-to-phase short circuiting is determined with regard to output terminals between U-phase and V-phase and between U-phase and W-phase outside the motor inverter 10 as described below. The microcomputer 60 turns off the switching element S2 as the U-phase lower arm element, the switching element S3 as the V-phase upper arm element, and the switching element S5 as the W-phase upper arm element and turns on the switching element S4 as the V-phase lower arm element and the switching element S6 as the W-phase lower arm element and generates a pulse signal to the switching element S1 as the U-phase upper arm element. As a result, current flows from the switching element S1 of the U-phase upper arm through the electric motor 80. If the voltage drop amount of the main capacitor 40 is not within a predetermined value or if the current is not within a predetermined value, the microcomputer 60 determines that the voltage or the current is abnormal. That is, outside short circuiting between the U-phase and V-phase output terminals or between U-phase and W-phase output terminals can be detected. If any abnormality is detected, the microcomputer 60 performs an alarm operation.

Phase-to-phase short circuiting is determined with regard to the output terminals between V-phase and U-phase and between V-phase and W-phase outside the motor inverter 10 as described below. The microcomputer 60 turns off the switching element S1 as the U-phase upper arm element, the switching element S4 as the V-phase lower arm element, and the switching element S5 as the W-phase upper arm element and turns on the switching element S2 as the U-phase lower arm element and the switching element S6 as the W-phase lower arm element and generates a pulse signal to the switching element S3 as the V-phase lower arm element. As a result, current flows from the switching element S3 of the V-phase upper arm through the electric motor 80. If the voltage drop amount of the main capacitor 40 is not within a predetermined value or if the current is not within a predetermined value, the microcomputer 60 determines that the voltage or the current is abnormal. That is, outside short circuiting between the V-phase and U-phase output terminals or between the V-phase and W-phase output terminals can be detected. If any abnormality is detected, the microcomputer 60 performs an alarm operation.

Phase-to-phase short circuiting is determined with regard to the output terminals between W-phase and U-phase and between W-phase and V-phase outside the motor inverter 10 as described below. The microcomputer 60 turns off the switching element S1 as the U-phase upper arm element, the switching element S3 as the V-phase upper arm element, and the switching element S6 as the W-phase lower arm element and turns on the switching element S2 as the U-phase lower arm element and the switching element S4 as the V-phase lower arm element and generates a pulse signal to the switching element S5 as the W-phase upper arm element. As a result, current flows from the switching element S5 of the W-phase upper arm through the electric motor 80. If the voltage drop amount of the main capacitor 40 is not within a predetermined value or if the measured current is not within a predetermined value, the microcomputer 60 determines that the voltage or the current is abnormal. That is, outside short circuiting between the W-phase and U-phase output terminals or between the W-phase and V-phase output terminals can be detected. If any abnormality is detected, the microcomputer 60 performs an alarm operation.

As described above, as shown in FIG. 4, the precharge operation can be stopped at a voltage of, for example, about 5 volts between the battery voltage and the capacitor voltage and the process can proceed to checking of phase-to-phase short circuiting (determining whether or not phase-to-phase short circuiting occurs), resulting in a reduction in precharge time.

That is, the microcomputer 60 turns off the drive element 51, so that no current flows through the precharge resistor 52 and phase-to-phase short circuiting is detected based on at least one of the current flowing and the voltage drop of the main capacitor 40. Since the drive element 51 is turned off before the relay contact 31 is turned on (closed), check current caused by the charge remaining in the main capacitor 40 flows toward the electric motor 80.

Specifically, as shown in FIG. 4, at a voltage of 5 volts between the battery voltage (36 volts, for example) and the capacitor voltage (31 volts, for example), the microcomputer 60 determines that phase-to-phase short circuiting can be detected and then turns off the drive element 51 to end the precharge operation. Subsequently, the microcomputer 60 starts the check of phase-to-phase short circuiting. In this case, the voltage drop amount estimated by current flow is compared with the value determined by the capacity of the main capacitor 40 and the resistance of the windings 81, 82, and 83, so that the normality or abnormality may be determined. That is, if the current flowing in the electric motor or the voltage drop amount is more than a threshold, abnormality is determined.

Figure 6:
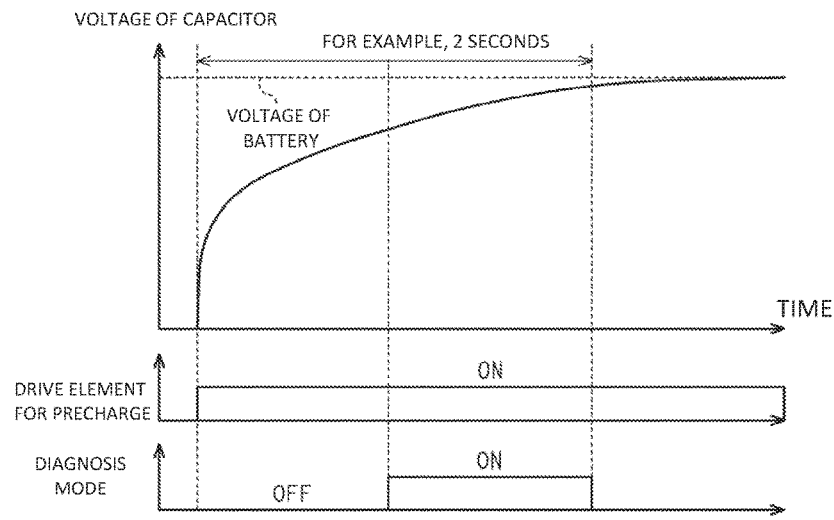
FIG. 6 is a timing chart illustrating the voltage of a capacity, the state of a drive element for precharge operation, and a diagnosis mode in a motor inverter as a comparative example.

FIG. 6 is a timing chart in a motor inverter as a comparative example. As shown in FIG. 6, a period (2 seconds, for example) for completing the precharge operation is needed. When a quick start operation is required, the period for the precharge operation is restricted by the period for the start operation. If a diagnosis mode is set during the precharge operation, the diagnosis starts before the completion of the charge operation. As a result, check current needs to flow while the voltage of the main capacitor 40 increases, with the result that much time is taken to attain a predetermined voltage drop amount. If the microcomputer 60 determines whether phase-to-phase short circuiting occurs at a voltage of the main capacitor 40 (electrolytic capacitor) kept constant during the precharge operation, the variation in the voltage to determine whether phase-to-phase short circuiting occurs is small.

In the present embodiment, the microcomputer 60 can determine whether or not phase-to-phase short circuiting occurs within a short time after the key switch 55 is turned on. Since the main capacitor 40 is disconnected from the battery 70, the microcomputer 60 may accurately determine whether or not phase-to-phase short circuiting occurs based on the voltage drop amount.

The motor inverter 10 according to the present embodiment described above has the following advantageous effects.

(1) The motor inverter 10 has the following configuration. The microcomputer 60 as a controller turns on (closes) the drive element 51 in response to the "ON" operation of the key switch 55 as an operational switch until the voltage of the main capacitor 40 reaches a predetermined threshold capable of determining whether or not phase-to-phase short circuiting occurs. After the main capacitor 40 is charged, the microcomputer 60 turns off (opens) the drive element 51 and controls the switching operation of the switching elements S1 to S6 of the inverter circuit 20. In a state that the main capacitor 40 is charged and that the drive element 51 is turned off (open), the microcomputer 60 as a determiner determines whether or not phase-to-phase short circuiting occurs based on at least one of current flowing in the inverter circuit 20 and voltage of the main capacitor 40. Accordingly the microcomputer 60 can easily determine whether or not phase-to-phase short circuiting occurs (determination of normality or abnormality) by using electric charge remaining in the main capacitor 40.

(2) Since the microcomputer 60 turns off the drive element 51 (open) as an opening and closing part and then determines whether or not phase-to-phase short circuiting occurs before the completion of the precharge operation, the microcomputer 60 can quickly determine whether phase-to-phase short circuiting occurs after the key switch 55 is turned on.

(3) Since the microcomputer 60 as a determiner determines whether or not phase-to-phase short circuiting occurs based on the voltage drop amount of the main capacitor 40, the microcomputer 60 can accurately determine whether or not phase-to-phase short circuiting occurs.

The present invention is not limited to the above-described embodiments, but may be modified into various alternative embodiments, as exemplified below.

The microcomputer 60 may determine whether or not phase-to-phase short circuiting occurs based only on current flowing in the inverter circuit 20, based only on voltage drop amount of the main capacitor 40, or based on both current flowing in the inverter circuit 20 and voltage of the main capacitor 40. The microcomputer 60 may determine whether or not current or voltage is abnormal based on both current flowing in the inverter circuit 20 and voltage of the main capacitor 40.

Figure 5:
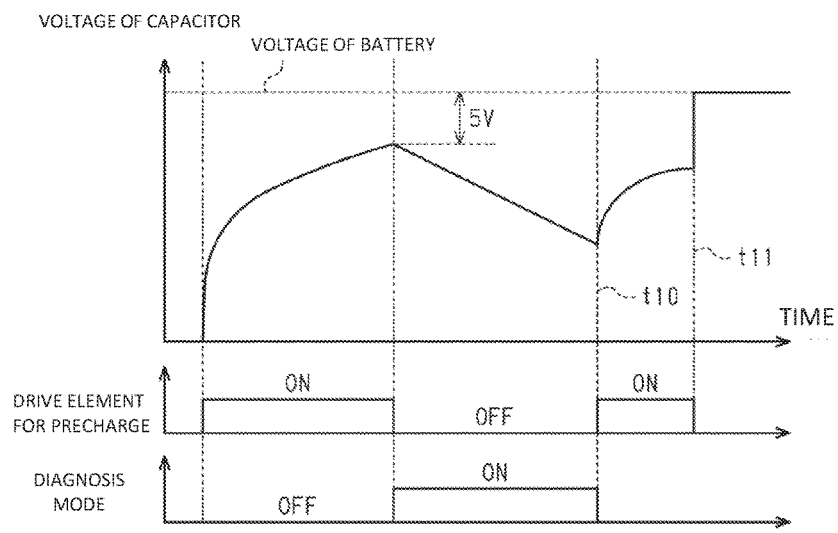
FIG. 5 is a timing chart illustrating the voltage of a capacity, the state of a drive element for precharge operation, and the diagnosis mode in a motor inverter according to an alternative embodiment of the present invention.

As shown in FIG. 5, the microcomputer 60 may function as a precharge controller for precharging again, which turns on (closes) the drive element 51 to precharge the main capacitor 40 again and then closes the main relay 30 in the case that the voltage of the main capacitor 40 decreases below a threshold (10 volts, for example) during detection of the phase-to-phase short circuiting. That is, if the microcomputer 60 determines that no phase-to-phase short circuiting occurs and the voltage of the main capacitor 40 decreases largely below the threshold, the microcomputer 60 executes a precharge operation again and then turns on (opens) the relay contact 31. Specifically, if the voltage of the main capacitor 40 decreases largely (up to 10 volts, for example), the microcomputer 60 executes the precharge operation again during the period between the timings t10 and t11 shown in FIG. 5 after determining whether or not phase-to-phase short circuiting occurs and then turns on (closes) the relay contact 31. This configuration described above can prevent large current from flowing in the main capacitor 40 when the relay contact 31 is turned on (closed), and protect the main capacitor 40 from large current.

When the microcomputer 60 determines whether or not phase-to-phase short circuiting occurs, the voltage of the main capacitor 40 may or may not reach the voltage of the battery 70. Although the microcomputer 60 determines whether or not phase-to-phase short circuiting occurs as described above, the microcomputer 60 may determine whether or not short circuiting occurs in the switching elements before detection of phase-to-phase short circuiting.

In summary, the opening and closing part is closed in response to an "ON" signal from the operational switch until the voltage of the capacitor reaches a predetermined threshold enabling detection of the phase-to-phase short circuiting. After the capacitor is charged, the controller opens the opening and closing part and controls the operation of the switching elements of the inverter circuit. At this point of time, the controller may determine whether or not short circuiting occurs based on at least one of current flowing in the inverter circuit and voltage of the capacitor.

What is claimed is:
1. A motor inverter comprising;
an inverter circuit having a plurality of switching elements connected in bridge configuration, wherein the inverter circuit includes an electric power input connected to a direct current (DC) power supply and an output connected to multiphase windings of an electric motor, and wherein each phase winding of the electric motor is supplied with electric power by a switching operation of the switching elements to drive the electric motor;
a capacitor connected to the electric power input of the inverter circuit in parallel with each other;
a precharge circuit including an opening and closing part provided in a line through which electric charge is accumulated in the capacitor and connected to the DC power supply via an operational switch, wherein the precharge circuit precharges the capacitor in response a turn-on operation of the operational switch before a main relay connected between the electric power input of the inverter circuit and the DC power supply is closed;
a microcomputer configured to:
close the opening and closing part in response to the turn-on operation of the operational switch;
open the opening and closing part in response to determining that the electric charge is accumulated in the capacitor and voltage of the capacitor reaches a first predetermined voltage value; and
determine whether or not short circuiting occurs based on at least one of current flowing in the inverter circuit and voltage of the capacitor when the electric charge is accumulated in the capacitor and the opening and closing part is opened,
wherein, in response to determining that the voltage of the capacitor decreases below a second predetermined voltage value which is lower than the first predetermined voltage value while determining whether or not the short circuiting occurs, the microcomputer closes the opening and closing part to precharge the capacitor again;
wherein the microcomputer determines that the short circuiting has not occurred in response to a voltage drop amount of the capacitor being less than a predetermined voltage drop amount.
2. The motor inverter according to claim 1, wherein the microcomputer determines whether the short circuiting occurs based on both the current flowing the inverter circuit and the voltage of the capacitor.

* * * * *